United States Patent
Takahashi

(10) Patent No.: US 7,447,260 B2
(45) Date of Patent: Nov. 4, 2008

(54) EQUALIZER, EQUALIZATION METHOD, AND TRANSMITTER

(75) Inventor: Seigo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 10/457,006

(22) Filed: Jun. 9, 2003

(65) Prior Publication Data

US 2004/0041652 A1    Mar. 4, 2004

(30) Foreign Application Priority Data

Jun. 10, 2002  (JP) .............................. 2002-168530

(51) Int. Cl.
H03H 7/30 (2006.01)
H03H 7/40 (2006.01)
H03K 5/159 (2006.01)

(52) U.S. Cl. ...................................... 375/229; 375/296

(58) Field of Classification Search ................. 375/224, 375/227, 285, 229, 232, 296, 346, 348, 350, 375/219, 259
See application file for complete search history.

(56) References Cited

U.S. PATENT DOCUMENTS

| | | | | |
|---|---|---|---|---|
| 4,527,275 A * | 7/1985 | Russell | ........................ | 375/145 |
| 5,237,415 A * | 8/1993 | Koguchi et al. | ............. | 348/614 |
| 5,237,588 A | 8/1993 | Tanaka et al. | | |
| 5,268,930 A * | 12/1993 | Sendyk et al. | ............... | 375/231 |
| 5,274,512 A * | 12/1993 | Tanaka et al. | .................. | 360/65 |
| 5,287,385 A * | 2/1994 | Sugawara et al. | ........... | 375/341 |
| 5,444,696 A * | 8/1995 | Petranovich | ................. | 370/337 |
| 5,617,450 A * | 4/1997 | Kakuishi et al. | ............. | 357/230 |
| 5,659,581 A * | 8/1997 | Betts et al. | ................... | 375/296 |
| 6,266,367 B1 * | 7/2001 | Strait | ......................... | 375/229 |
| 6,714,587 B1 * | 3/2004 | Van Houtum et al. | ....... | 375/220 |
| 2001/0007433 A1 * | 7/2001 | Abe | ........................... | 327/552 |
| 2003/0043900 A1 * | 3/2003 | Deas et al. | .................. | 375/234 |

FOREIGN PATENT DOCUMENTS

| | | |
|---|---|---|
| JP | 2-238729 | 9/1990 |
| JP | 2-305033 | 12/1990 |
| JP | 4-34036 | 9/1992 |

(Continued)

OTHER PUBLICATIONS

Alan Fiedler, et al., "A 1.0625 Gbps Transceiver with 2x-Oversampling and Transmit Signal Pre-Emphasis", *1997 IEEE International Solid-State Circuits Conference*, Feb. 7, 1997, pp. 238-239, and 464.

(Continued)

*Primary Examiner*—Jean B Corrielus
(74) *Attorney, Agent, or Firm*—McGinn IP Law Group, PLLC

(57) ABSTRACT

An equalizer includes a waveform detection circuit, an equalization transmission circuit, and an equalization parameter setting circuit. The waveform detection circuit observes a first characteristic parameter of a first input signal. The equalization transmission circuit outputs an equalization transmission signal obtained by changing a second input signal based on a predetermined equalization parameter. The equalization parameter setting circuit sets the equalization parameter based on the first characteristic parameter. A transmission line which supplies the first input signal and a transmission line to which the equalization transmission signal is output have mutually similar transmission properties.

12 Claims, 15 Drawing Sheets

FOREIGN PATENT DOCUMENTS

JP    8-316882    11/1996
JP    10-136028   5/1998

OTHER PUBLICATIONS

Muneo Fukaishi, et al., "A 20Gb/s CMOS Multi-Channel Transmitter and Receiver Chip Set for Ultra-High Resolution Digital Display", *2000 IEEE International Solid-State Circuits Conference*. TP 15.7-15.7.7.

Chinese Office Action dated Jun. 10, 2005, with English translation.

Japanese Office Action dated Jul. 15, 2008 with partial English-Language translation.

* cited by examiner

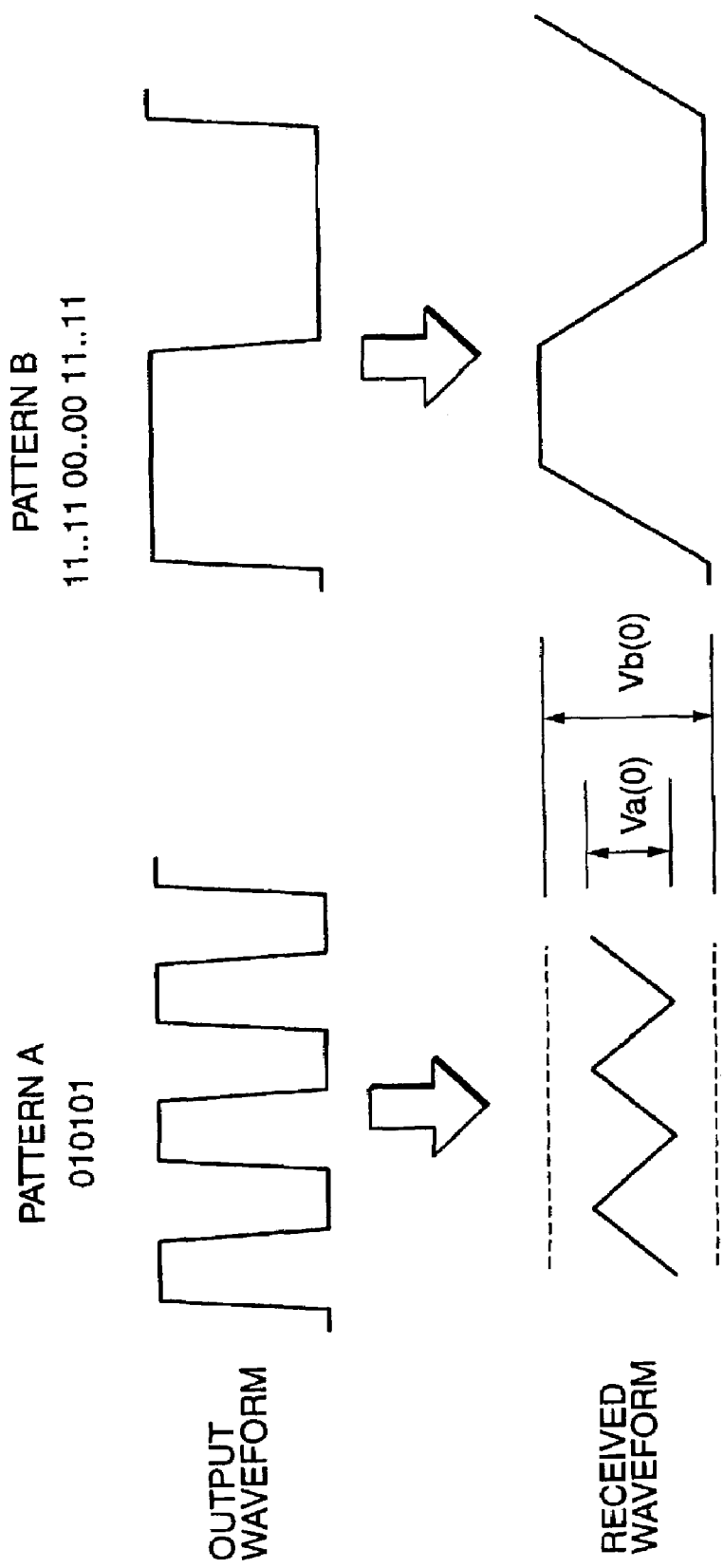

EQUALIZER, EQUALIZATION METHOD, AND TRANSMITTER

This application claims priority to prior application JP 2002-168530, the disclosure of which is incorporated herein by reference.

BACKGROUND OF THE INVENTION

The present invention relates to an equalizer, an equalization method, and a transmitter. Particularly, the present invention relates to an equalizer and equalization method for compensating attenuation of high frequency components caused by the skin effects of-transmission line conductors, the dielectric loss of a printed board material and the like in a high speed interconnection system in between a plurality of printed boards constituting a large capacity communication device such as an IP router or a cross connector or a large scale information processing device such as a super computer, and to a transmitter.

As an example, FIG. 1 shows a constitution of a large capacity communication device that transmission and reception of an electric signal are performed between different printed boards (hereinafter referred to as "PKG") 1a and 1b via a back board (hereinafter referred to as "BWB") 2. The electric signal to be transmitted is transmitted from a transmitting circuit 11a to a receiving circuit 12b, and a transmission line 20 comprises pattern wirings 20 formed on PKGs 1 and BWB2 and BWB connectors 21 for electrically connecting the specific pattern wirings 20 formed on the PKGs 1 and BWB2 to each other. The total length of the pattern wirings 20 extending from the transmitting circuit 11a to the receiving circuit 12b is several tens of centimeters to several meters.

In a range where the bit rate of an electric signal transmitted through the pattern wirings 20 exceeds 1 Gbps, frequency dependency occurs in the transmission properties of the electric signal, due to an increase in transmission loss caused by the skin effects of conductors forming the pattern wirings 20 and an increase in dielectric loss of insulators constituting the printed boards 1 and BWB 2 in addition to the electric resistance of the conductors. More specifically, a received code error occurs due to intersymbol interference caused by so-called waveform distortion which is significant attenuation of the high frequency components of the transmitted signal. FIG. 2 shows an example of a received waveform with significantly attenuated high frequency components.

To deal with such a problem, a technique referred to as preemphasis which comprises performing equalization at the time of transmission has heretofore been known. The preemphasis technique is described in A. Fiedler et al., "A 1.0625 Gbps Transceiver with 2× Oversampling and Transmit Signal Pre-emphasis,", Proc. IEEE Int. 1 Solids-State Circuits Conf., Digest of Technical Papers, IEEE Press, Piscataway, N.J., 1997, pp. 238-239, or M. Fukaishi, K. Nakamura, M. Yotsuyanagi, et. al., "A 20-Gb/s CMOS Multi-Channel Transmitter and Receiver Chip Set for Ultra-High Resolution Digital Display", 2000 ISSCC Digest of technical Papers, San Francisco, pp. 260-261, February 2000. FIG. 3 shows a measurement example of the waveform of a signal equalized at the time of transmission.

In this preemphasis method, an equalizing circuit for emphasizing high frequency components is provided to the transmitting circuit 11a so as to emphasize the high frequency components of the spectrum of a signal to be transmitted at the time of transmission of the signal and compensate for attenuation of the high frequency components in the transmission line. Thereby, the influence of intersymbol interference on a received signal is reduced, and transmission and reception free from code errors are performed.

In the above method of performing equalization at the time of transmission, an equalization parameter must be set for each transmitting circuit from the following two reasons.

(1) Attenuations of high frequency components in the pattern wirings 20 take different values. From the viewpoint of the constitution of the device, the lengths of the pattern wirings 20 are not the same. The pattern wirings 20 are ones on the PKGs which are connected to the adjacent BWB, and one on the BWB which is connected to the PKGs at both ends. For example, the length of the pattern wiring may range from 10 cm to 100 cm. Thus, the length of the pattern wiring varies within a certain range, and according to its transmission distance, the attenuation of the high frequency components varies within a certain range.

(2) An optimum equalization parameter solely exists for a certain length of the pattern wiring. When emphasis of the high frequency components by equalization is excessive, an eye opening becomes small while a maximum amplitude becomes large, thereby reducing a receiving margin disadvantageously.

Referring to FIG. 4, brief description will be made of the constitution of a related equalization parameter setting circuit. There is no means for automatically knowing the length of the pattern wirings connecting the transmitting circuit 11a and the receiving circuit 12b to each other. Therefore, different equalization parameters S1301 must be set for the transmitting circuits 11a after assembly of the device.

In the above-mentioned related art, setting of the equalization parameter S1301 every time the power is turned on has been avoided generally by use of storage means such as a nonvolatile memory. However, it must be manually set at least once after assembly of the device. This is because pattern wirings 20 to which a certain transmitting circuit 11a is connected are determined for the first time when PKGs 1a and 1b are connected to BWB 2 at the time of the assembly of the device and, before that, there is no means for knowing the length of the pattern wirings 20, so that the equalization parameter S1301 cannot be determined.

As a result of making such a manual setting, labor costs required for the setting and reservation of the stock for a time period required for the adjustment arise, thereby causing an increase in the price of the device.

SUMMARY OF THE INVENTION

It is therefore an object of the present invention to provide an equalizer, an equalization method and a transmitter which are capable of automatically setting an equalization parameter so as to reduce device costs.

To achieve the above object, an equalizer according to the present invention comprises a waveform detection circuit for observing a first characteristic parameter of a first input signal, an equalization transmission circuit for changing a second input signal based on a predetermined equalization parameter, and an equalization parameter setting circuit for setting the equalization parameter based on the first characteristic parameter. The first and second input signals are input via transmission lines having mutually similar transmission properties.

The equalizer may further comprise an initialization control circuit for sweeping the equalization parameter within a predetermined range.

The equalizer may further comprise a memory for storing a relationship between the first characteristic parameter and the swept equalization parameter.

The equalization transmission circuit may be constituted so as to give, to the second input signal, preemphasis in which attenuation decreases at a predetermined cut-off frequency or more.

The cut-off frequency may be used as the above equalization parameter.

Alternatively, a rate of change in the above attenuation may be used as the above equalization parameter.

The first input signal is a binary signal, and an opening ratio of an eye pattern may be used as the above first characteristic parameter.

The binary signal may include a pseudorandom pattern.

Alternatively, the binary signal may include a plurality of different fixed patterns.

An equalization method according to the present invention comprises a waveform detection step of observing a first characteristic parameter of a first input signal, an equalization parameter setting step of setting an equalization parameter based on the first characteristic parameter, and an equalization transmission step of changing a second input signal based on the equalization parameter. The first and second input signals are input via transmission lines having mutually similar transmission properties.

The equalization method further comprises an initialization control step of sweeping the equalization parameter within a predetermined range.

The equalization method further comprises a storage step of storing a relationship between the first characteristic parameter and the swept equalization parameter.

The equalization transmission step may be constituted so that preemphasis in which attenuation decreases at a predetermined cut-off frequency or more may be given to the second input signal.

The cut-off frequency may be used as the equalization parameter.

Alternatively, a rate of change in the above attenuation may be used as the equalization parameter.

The first input signal is a binary signal, and the opening ratio of an eye pattern may be used as the first characteristic parameter.

The binary signal may include a pseudorandom pattern.

Alternatively, the binary signal may include a plurality of different fixed patterns.

The equalization parameter setting step may be constituted such that the ratio of the amplitude of the signal to the plurality of different fixed patterns is used as the opening ratio.

A transmitter according to the present invention comprises a first transmit-receive circuit and a second transmit-receive circuit, and a first transmission line and a second transmission line which connect the first and second transmit-receive circuits. The first and second transmit-receive circuits have the above-mentioned equalizer.

As a result of adopting the above constitutions for the equalizer, equalization method and transmitter of the present invention, an equalization parameter can be set automatically, whereby a reduction in device costs can be expected.

BRIEF DESCRIPTION OF THE DRAWINGS

FIG. 19 is a diagram illustrating the principle of an embodiment of the present invention.

DESCRIPTION OF THE PREFERRED EMBODIMENTS

Next, embodiments of the present invention will be described with reference to the drawings.

Prior to detailed descriptions of the embodiments, the principle of the present invention will be described first. A method for controlling an equalization parameter according to the present invention has a mechanism of selecting an optimum equalization parameter as an initialization routine of a transmit-receive circuit at the time of turning on the power of a device. More specifically, as a step in a series of initialization steps after the power is turned on, an optimum equalization parameter is set according to the following procedures.

(1) Equalization parameter setting circuits 130 on PKGs 1*a* and 1*b* have counters which operate in synchronization with each other or simultaneously. While a random signal pattern S1101 is transmitted from a transmitting circuit 110, an equalization parameter S1301 is swept from a minimum to a maximum at a common time determined by both counters.

(2) In a receiving circuit 123, by use of the ratio of the eye openings of a received signal S1201 to the total amplitude or means for measuring the shape of a received waveform, a counter value at which an eye opening ratio of the received signal reaches a maximum is stored.

(3) The equalization parameter S1301 corresponding to the counter value obtained in the above (2) is set as an optimum equalization parameter for a transmitting circuit which is paired with the receiving circuit 123 and disposed on the same PKG where the receiving circuit 123 is disposed.

Figure 7:
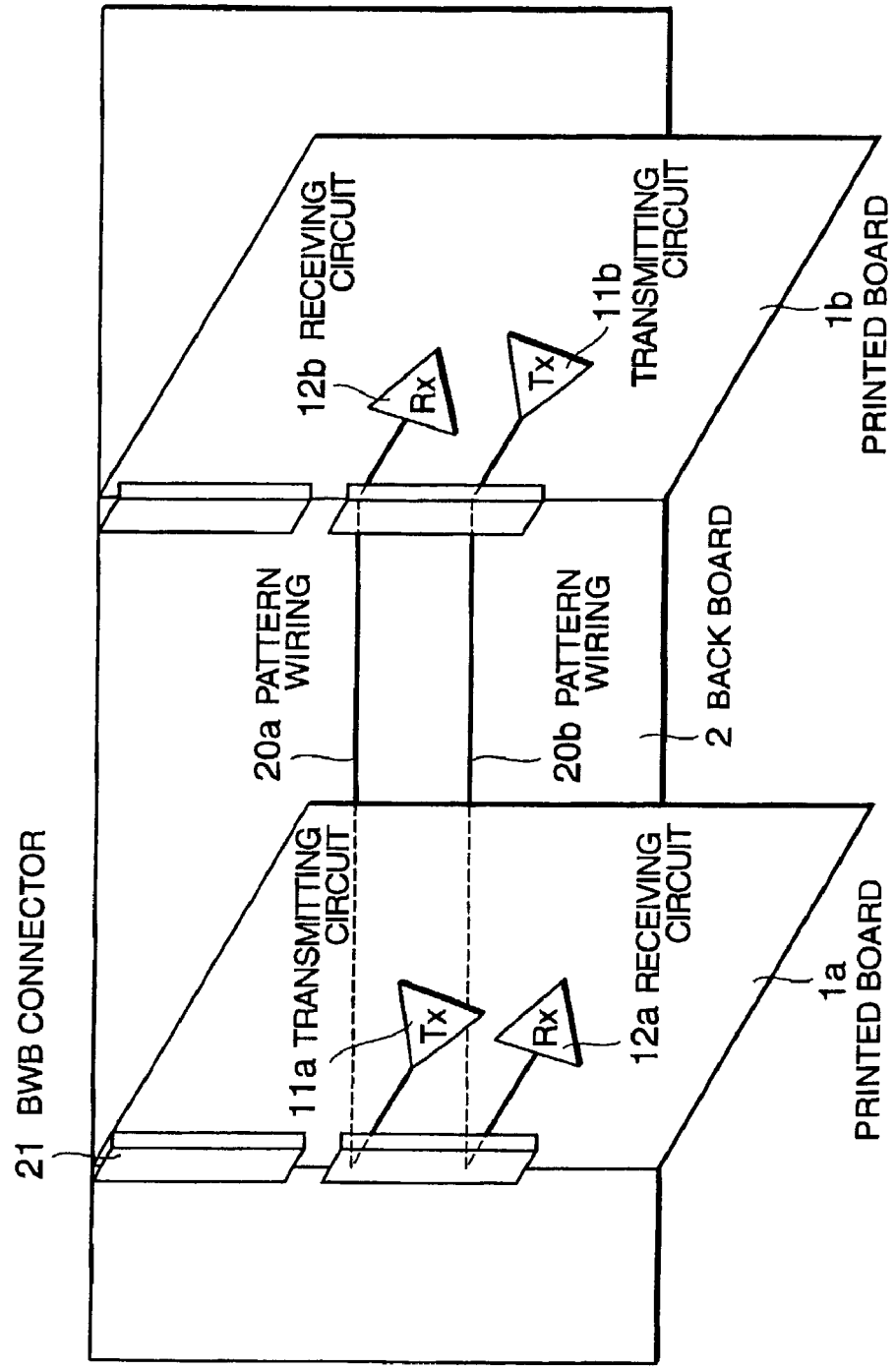
FIG. 7 is a schematic diagram illustrating the constitution of a device to which the present invention is applied.

In the device constitution to which the equalization parameter control method of the present invention is applied, transmission of signals between PKGs 1*a* and 1*b* is not one-way transmission. In general, a full-duplex circuit as shown in FIG. 7 is provided, and on the PKGs 1a and 1b on both ends of a pair of pattern wirings 20a and 20b, pairs of transmitting circuits and receiving circuits (11a and 12a, and 11b and 12b) are provided.

The lengths of the pattern wirings 20 in the full-duplex constitution can be designed as equal-length wirings at the time of designing BWB 2 and the PKGs 1 which are connected to the BWB 2. The wirings can be designed such that a rate of attenuation of high frequency components is equal in both transmission directions between the PKGs.

Insofar as such a constitution of full-duplex wirings, the receiving circuit 12a which is provided on the same PKG 1a where the transmitting circuit 11a is provided can receive the same waveform as that received by the receiving circuit 12b which is located at a far end opposing to the transmitting circuit 11a. That is, when the wiring conditions of the pattern wirings 20a and 20b are the same, it can be said that the receiving circuit 12a and the receiving circuit 12b are equivalent.

Figure 5:
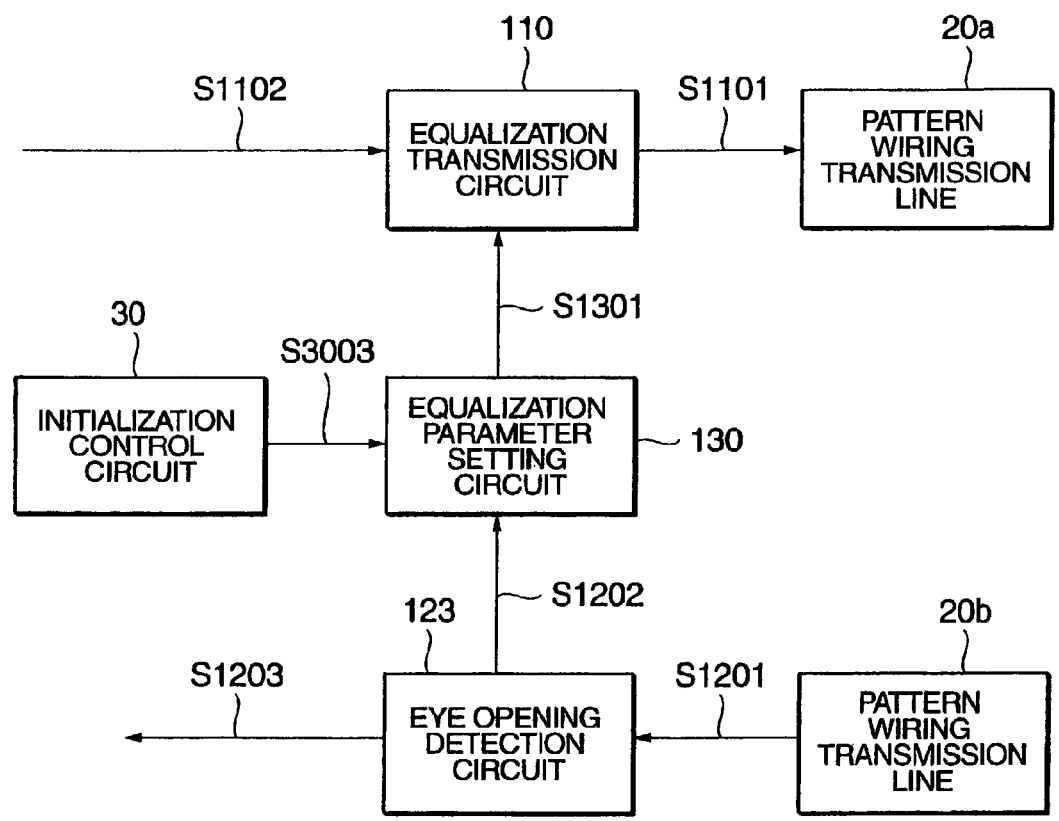
FIG. 5 is a block diagram showing a basic constitution of the present invention.

As a result, optimum equalization parameters obtained by staring the above steps (1) to (3) simultaneously in the transmitting circuits 11 and the receiving circuits 12 at both ends of the pair of pattern wirings 20a and 20b can be detected only by the pairs of adjacent transmitting and receiving circuits as shown in FIG. 5.

By use of the above-described control method, a proper equalization parameter associated with a wiring between PKGs in an arbitrary positional relationship can be detected automatically as an initialization routine of the device.

Further, it is assumed that equalization is carried out by preemphasis on a transmission side. That is, a circuit for performing preemphasis is provided in the equalization transmission circuit 110. This circuit has constant transmittance for low frequency components of an input signal, while it has increasing transmittance for high frequency components of a predetermined frequency or more. In this case, as an equalization parameter, a frequency (cut-off frequency) at which constant transmittance changes into increasing transmittance or a rate of increase in transmittance in a high frequency range can be used.

Hereinafter, the present invention will be described in detail with reference to more specific embodiments.

First Embodiment

Referring to FIG. 5, description will be made of the constitution of an embodiment of an equalization transmit-receive circuit according to the present invention.

Circuits which make settings comprise an equalization transmission circuit 110, an eye opening detection circuit 123, an equalization parameter setting circuit 130, and an initialization control circuit 30.

Figure 10:
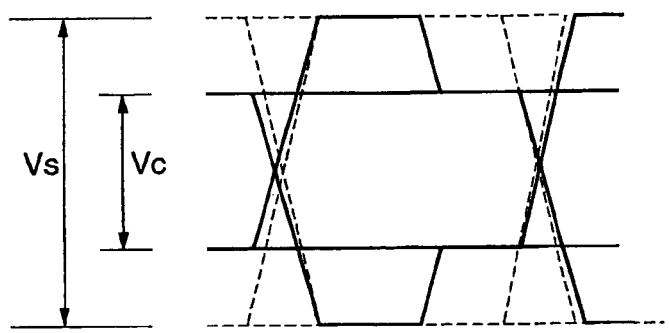
FIG. 10 is a schematic diagram showing an example of a waveform.

Further, hereinafter, the amplitude of a waveform having a pulse component such as "01" is defined as Vs, the amplitude of the same code continuous waveform is defined as Vc, and an eye opening ratio is defined as Vc/Vs. As shown in FIG. 10, since high frequency components are emphasized by equalization transmission, Vs becomes larger in value than Vc.

The initialization control circuit 30 activates a step of setting an equalization parameter as a step in a series of initialization steps of the whole device.

The equalization transmission circuit 110 subjects a transmission input signal S1102 to a transmission equalization treatment of the intensity corresponding to an equalization parameter input S1301 and sends out a transmission signal S1101 with emphasized high frequency components to a pattern wiring 20a.

The eye opening detection circuit 123 measures an eye opening ratio of a received signal S1201 transmitted through a pattern transmission line 20b.

Figure 8:
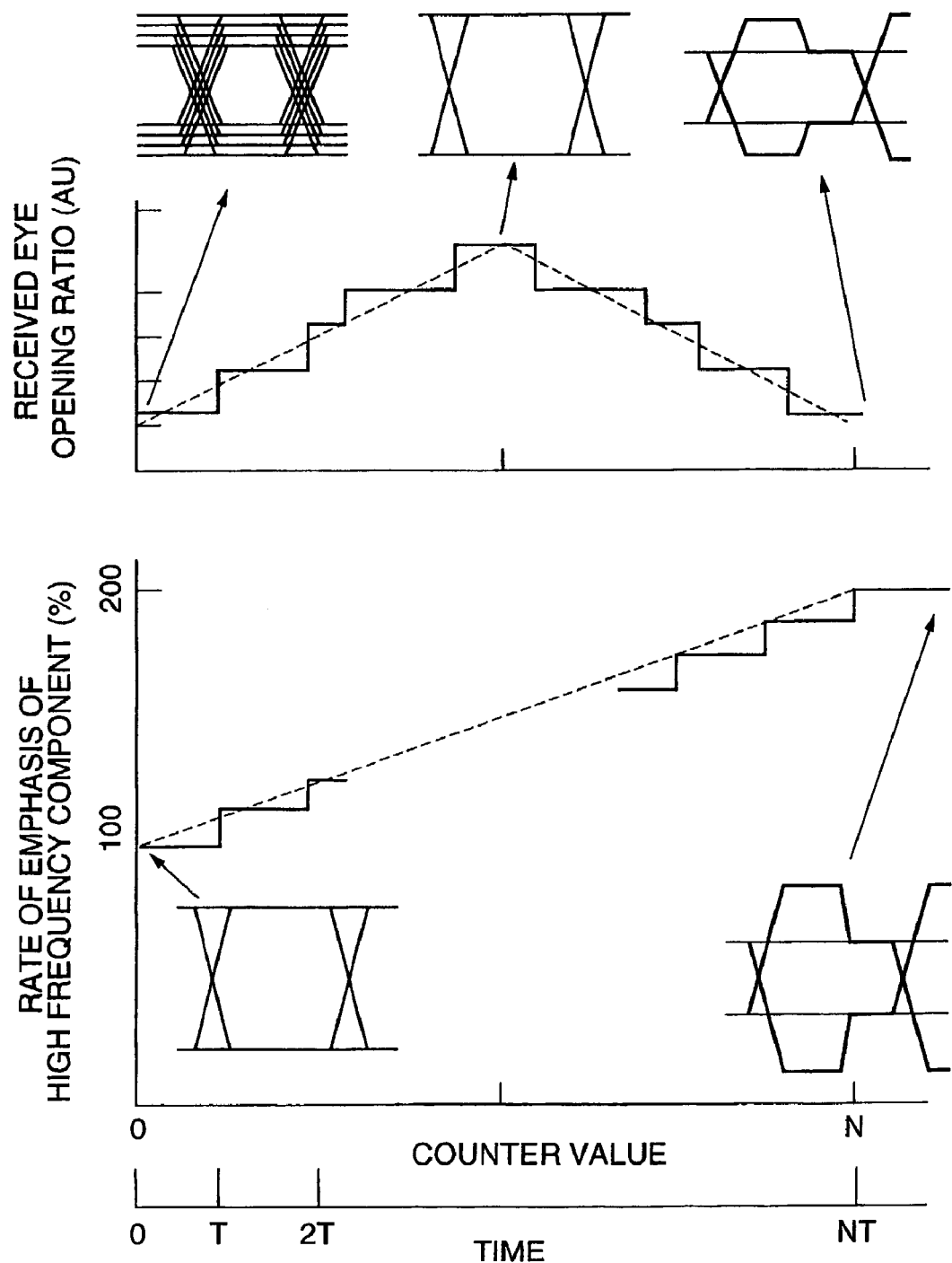
FIG. 8 is a diagram illustrating a method of sweeping an equalization parameter according to the present invention.

Upon receipt of a signal S3003 for initiating a process of setting an optimum equalization parameter, the equalization parameter setting circuit 130 divides a counter into N steps at a predetermined time interval T and sweeps from a maximum to a minimum, as illustrated in FIG. 8. The equalization parameter S1301 changes according to the value of the counter.

Figure 1:
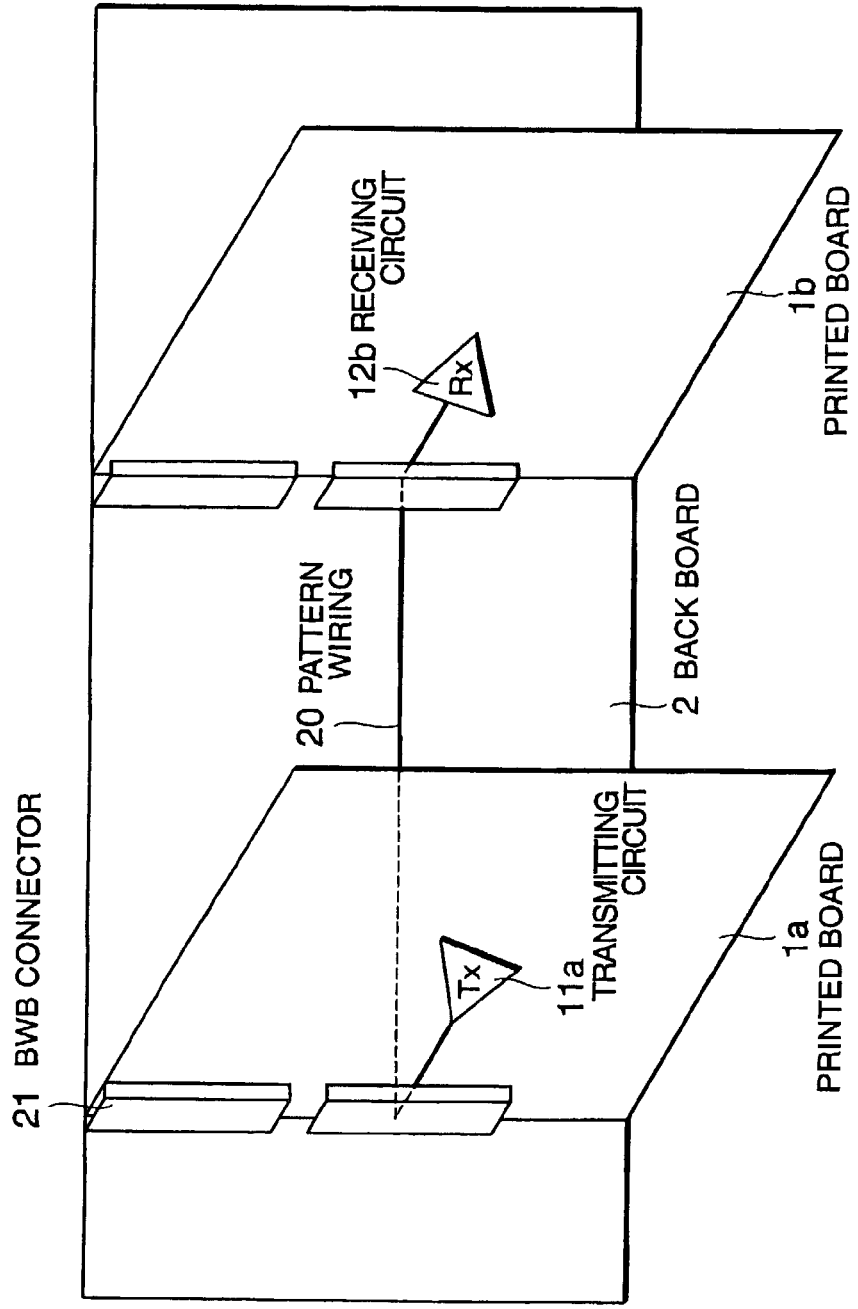
FIG. 1 is a schematic diagram illustrating a related device.
Figure 2:
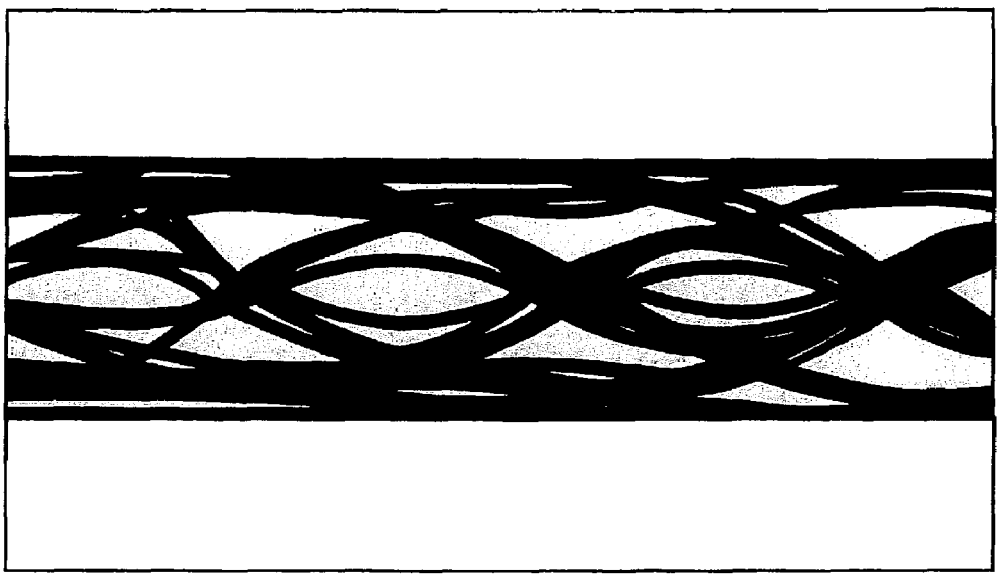
FIG. 2 is a measurement example of the waveform of a signal with attenuated high frequency components.
Figure 9:
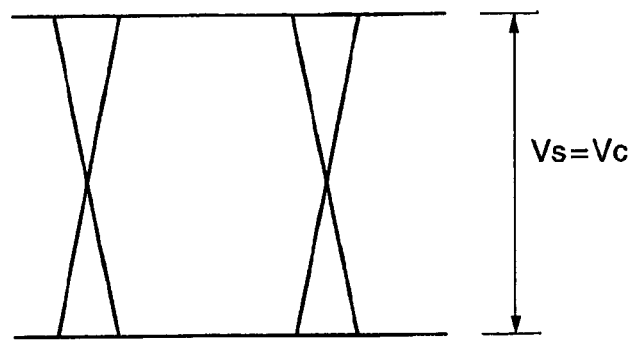
FIG. 9 is a schematic diagram showing an example of a waveform.

When the counter in the equalization parameter setting circuit 130 is 0, the output from the equalization transmission circuit has a waveform of an ordinary eye pattern as shown in FIG. 9. The received waveform S1201 after transmission through the pattern wiring 20 is deformed as shown in FIG. 2 or 11 due to attenuation of high frequency components, Vs becomes smaller than Vc, sufficient eye openings are not obtained, so that reception properties are degraded.

Figure 3:
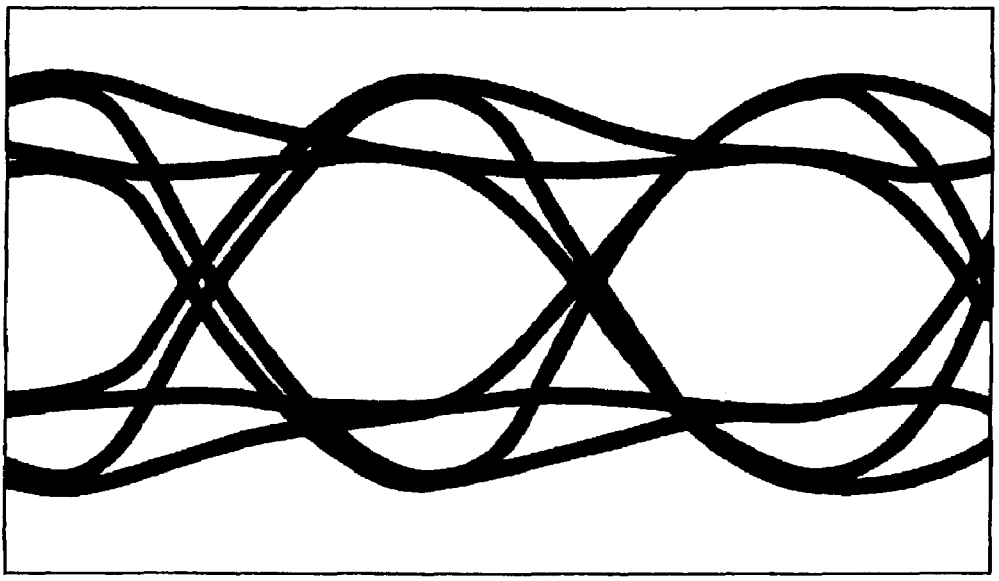
FIG. 3 is a measurement example of the waveform of a signal subjected to equalization transmission.
Figure 4:
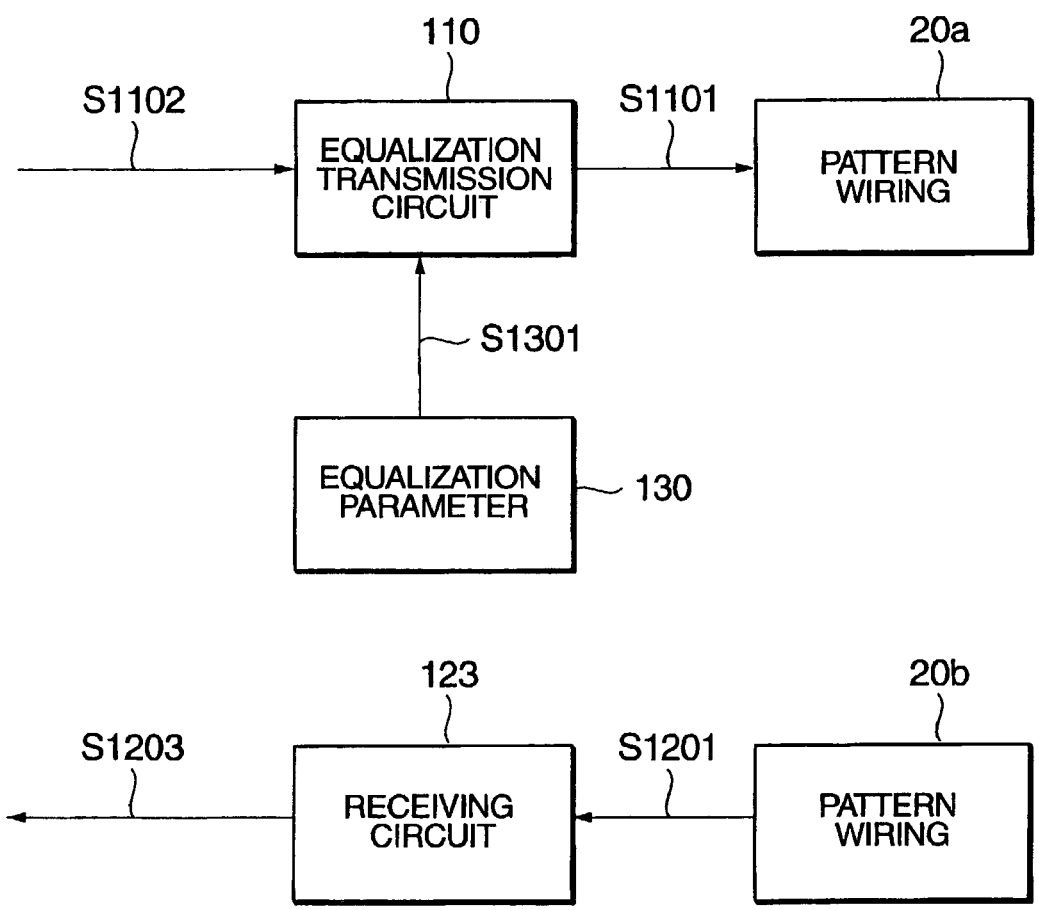
FIG. 4 is a block diagram showing a related circuit for setting an equalization parameter.
Figure 12:
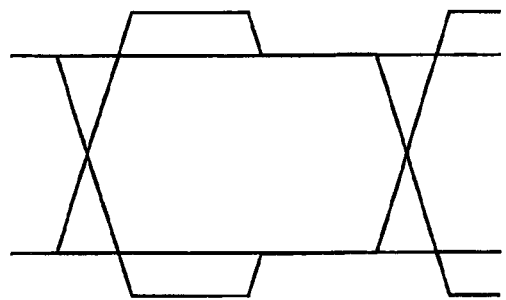
FIG. 12 is a schematic diagram showing an example of a waveform.

When the counter in the equalization parameter setting circuit 130 is equal to the maximum value N, the output signal S1101 from the equalization transmission circuit 110 has a waveform as shown in FIG. 3 or 10. The waveform S1201 after transmission through the pattern wiring 20 is deformed as shown in FIG. 12 due to attenuation of high frequency components. In this case, since the high frequency components emphasized by equalization remain, Vs becomes larger than Vc, the ratio of eye openings to the total amplitude is slightly decreased, so that reception properties are degraded.

Figure 11:
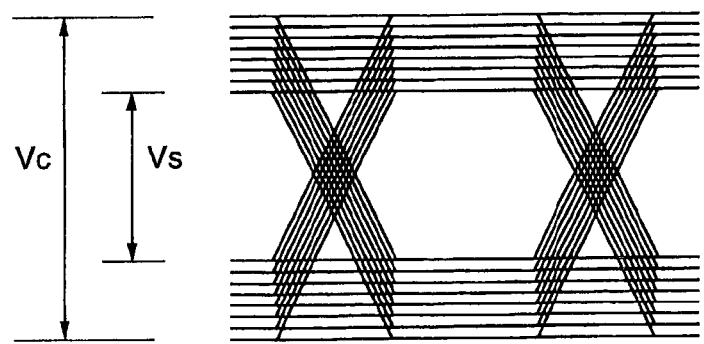
FIG. 11 is a schematic diagram showing an example of a waveform.

Further, when the value of the counter is a certain value between 0 and N, the output S1101 from the equalization transmission circuit 110 is transmitted with a waveform of Vs/Vc which is intermediate between FIG. 10 and FIG. 11. Upon receipt after transmission of the transmission signal, the waveform after transmission through the pattern wiring becomes a waveform of Vs=Vc with properly compensated losses of high frequency components as illustrated in FIG. 9, and a maximum eye opening ratio is obtained. At this time, the most stable receipt becomes possible.

Figures 13A, 13B:
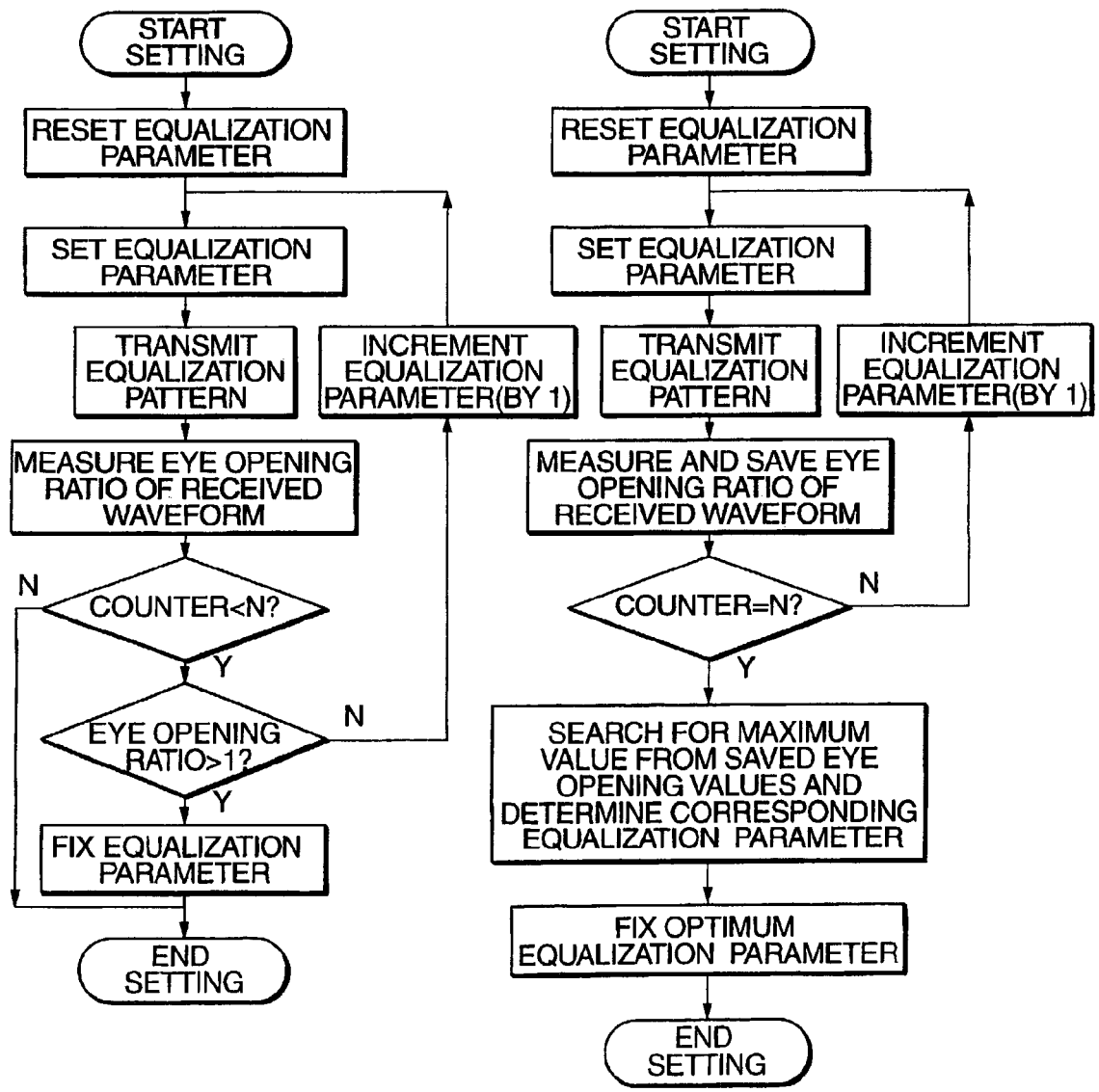
FIGS. 13A and 13B are flowcharts of steps of setting an equalization parameter.

Next, the steps of setting an optimum equalization parameter in the above constitution will be described by use of FIG. 13A.

Upon initiation of an equalization parameter setting process, firstly, a counter is set at 0. Then, for an equalization transmission circuit, an equalization parameter corresponding to the counter value is set, and a waveform equalized with the equalization parameter is transmitted. The signal to be transmitted uses a random pattern. Then, in a receiving circuit, the eye opening ratio Vs/Vc of a received waveform is measured. As described above, generally, when the counter is 0, the eye opening ratio Vs/Vc takes a value smaller than 1 due to significant losses of high frequency components in a pattern wiring, and as the value of the counter becomes larger, the rate of equalization becomes larger, and the eye opening ratio Vs/Vc approaches 1.

When an eye opening ratio measured in an eye opening ratio measuring circuit is smaller than 1, the value of the counter is incremented by 1, and the process returns to setting of the equalization parameter for the transmission circuit. A series of these steps are repeated at a predetermined time interval T. When the eye opening ratio exceeds 1, the value of the counter is fixed as an equalization parameter, thereby completing the equalization parameter setting process. When the value of the counter becomes 0, it can be determined that the effect of equalization is maximum even if the eye opening ratio Vs/Vc is smaller than 1, and N is therefore taken as an equalization parameter. A series of these steps are also carried out by similar circuits provided on the opposing side of the pattern wiring, and the steps are started simultaneously and repeated in the same manner at the time interval T on both sides of the pattern wiring.

Referring to FIG. 5, the above-mentioned steps will be described in more detail.

Upon receipt of a setting initiation signal S3003, the equalization parameter setting circuit 130 resets its counter at 0. Then, it sets a zero value in the equalization transmission circuit 110 so as to transmit a non-equalized waveform with an eye opening ratio (Vs/Vc) of 1 as shown in FIG. 9 to the pattern wiring 20a. The eye opening detection circuit 123 on the receiving circuit side measures the eye opening ratio (Vs/Vc) of the received waveform as shown in FIG. 11 of a signal S1201 transmitted via the pattern wiring 20b from the opposing transmitting circuit which operates simultaneously with the circuit 123. It is a common practice that Vs/Vc takes a value smaller than 1 for attenuation of high frequency components. In this measurement of the eye opening ratio, a method comprising performing multiple samplings and determining an average thereof can be used so as to reduce variations in the measurement value which are caused by measurement errors and noises. For example, when the measurement is repeated at intervals of 100 msec and a sampling frequency is 1 kHz, 100 measurements can be made, and by averaging the 100 samples, a sufficiently stable measurement can be made.

Then, the counter is incremented by 1, and when the value of the counter exceeds the maximum value N (e.g., N=16), 16 which is the maximum value is regarded as an equalization parameter. When the value of the counter is smaller than or equal to N (=16), it is determined whether the value of the measured equalization eye opening ratio is larger than or equal to 1. When the eye opening ratio is larger than or equal to 1, the value of the counter at that time is fixed as an optimum equalization parameter. When the eye opening ratio is smaller than 1, the counter value is incremented by 1, and the process returns to setting of the equalization parameter again.

By repetition of the above step, setting of the optimum equalization parameter is completed.

Second Embodiment

Figure 6:
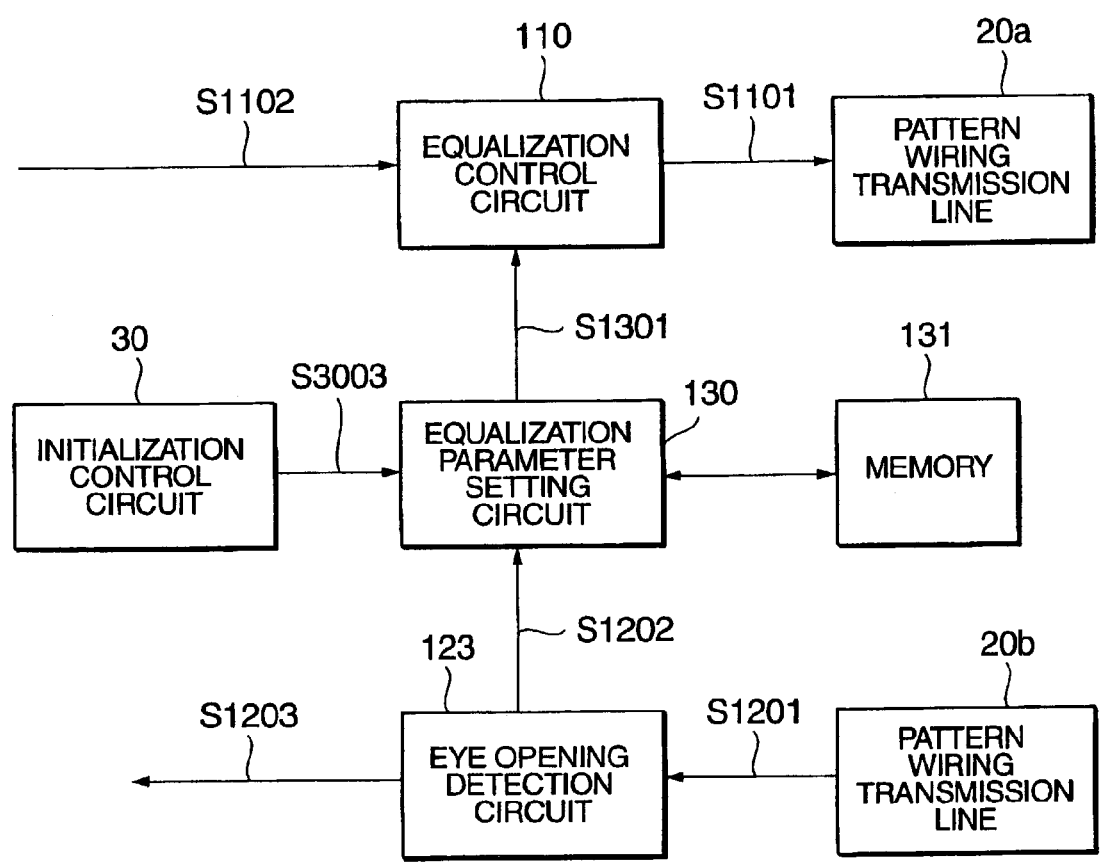
FIG. 6 is a block diagram showing a basic constitution of the present invention.

Referring to FIG. 6, description will be made of the constitution of a second embodiment of the present invention. FIG. 13B shows a flowchart of the steps of the second embodiment.

In the present constitution, a memory 131 which is connected to the equalization parameter setting circuit 130 in the aforementioned first embodiment is also used so as to perform a strict evaluation of an optimum eye opening ratio.

More specifically, upon initiation of an equalization parameter setting process, for all values of the counter which range from 0 to the maximum value N, an eye opening ratio is measured in the eye opening detection circuit 123, and the measurement values of the eye opening ratios are stored in the memory 131 as a data format in which the eye opening ratios are associated with the counter values.

The measurement is made for N times, and after the circuit 123 gets out of the process loop, it searches for an eye opening ratio which is closest to 1 in the memory, and the counter value corresponding to the closest ratio is fixed as an optimum equalization parameter.

Third Embodiment

Figure 14:
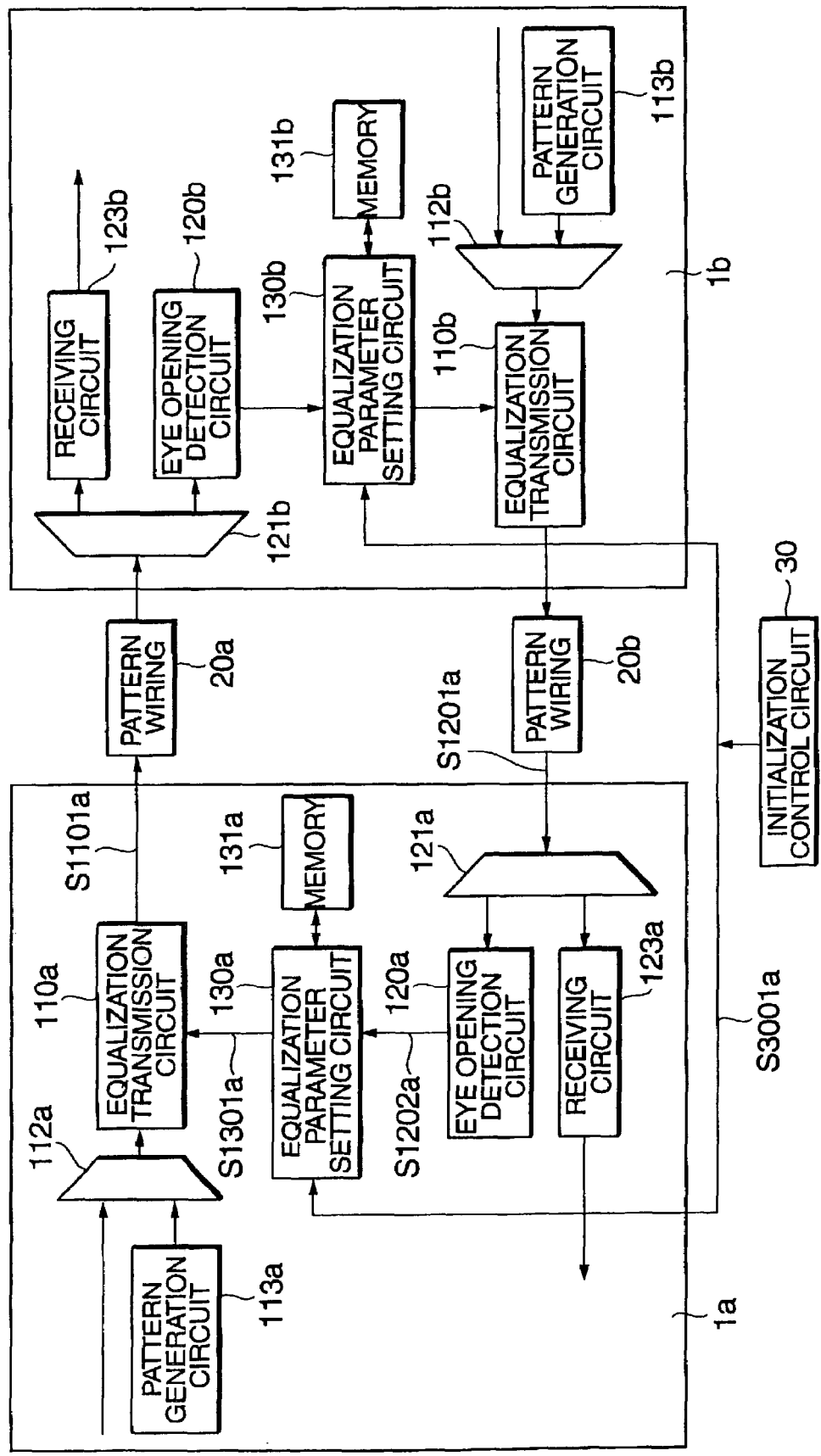
FIG. 14 is a diagram illustrating an embodiment of the present invention.

Referring to FIG. 14, description will be made of a detailed embodiment of a full-duplex circuit.

The present embodiment comprises PKGs 1a and 1b which oppose each other, a pair of pattern wirings 20a and 20b, and an initialization control circuit 30.

The initialization control circuit 30 gives a common initiation signal S3001 so that equalization parameter setting circuits 130a and 130b on PKGs 1a and 1b start operations simultaneously. Upstream of the equalization transmission circuits 110 on the PKGs 1 are provided pattern generation circuits 113 via selectors 112. During an equalization parameter setting process, the selectors 112 select the pattern generation circuits 113. The pattern generation circuits generate a pseudorandom pattern with a mark rate of 1/2 or a pattern similar to that during the equalization parameter setting process. The circuits at the receiving sides split signals S1201 transmitted through the pattern wirings 20 into two parts and distribute them to eye opening detection circuits 120 and receiving circuits 123.

In the constitution shown in FIG. 14 as well, the above procedural steps of setting of an optimum equalization parameter are initiated in the same manner in accordance with the initiation signal S3001 from the initialization control circuit 30. After completion of the setting, the equalization parameter setting circuit 130 transmits a setting completion signal to the initialization control circuit 30, whereby the setting of the equalization parameter is completed, and the initialization of the whole device is continued.

Fourth Embodiment

Figure 15:
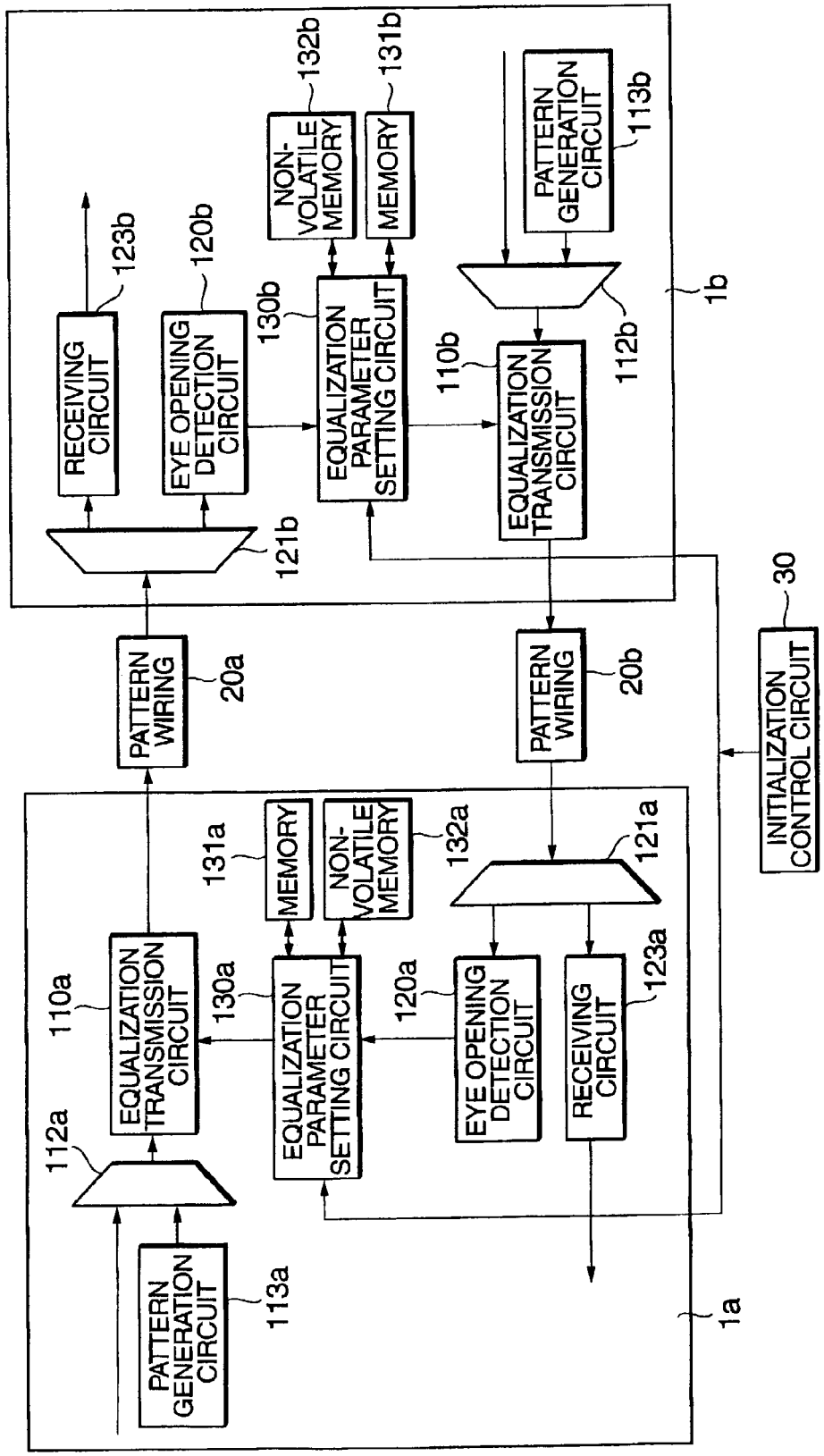
FIG. 15 is a diagram illustrating an embodiment of the present invention.

For example, when it is assumed that a 100-msec sampling process is carried out every time the value of a counter is counted up from 0 to a maximum value N=256, an optimum equalization parameter setting process takes about 30 seconds. To avoid repetition of the same setting process when the power of the device is turned off once and then turned on again, a once set equalization parameter is stored in a nonvolatile memory in PKG. This constitution is shown in FIG. 15.

After completion of setting of the optimum equalization parameters by the above steps, the set values are stored in nonvolatile memories 132 connected to equalization parameter setting circuits 30.

At the start of the initial equalization parameter setting process after the power of the device is turned on, firstly, the equalization parameter setting circuits 130 check whether equalization parameters are set in the nonvolatile memories 132. If not, the equalization parameter setting circuits 130 perform the above equalization parameter setting process. If equalization parameters are set in the nonvolatile memories 132, the equalization parameter setting circuits 130 send a setting completion signal to the initialization control circuit 30 without performing the above equalization parameter setting process.

To conform to changes in transmission conditions of the pattern wirings 20 such as replacement of PKGs 1 and changes of connection points on BWB 2 while the power of the device is cut off, each PKG has an ID code, and the nonvolatile memories 132 have the ID code of the opposing PKG and information of connection points (slot numbers) on BWB 2, in addition to optimum equalization parameters. Then, when the power is turned on again, the presence of the equalization parameters in the nonvolatile memories 132 is checked, and the IDs of the opposing PKGs and the slot numbers are also checked. Only when it is confirmed that there is no inconsistency in the constitutions of the PKGs and connection conditions, the equalization parameter setting process is omitted, while when there is inconsistency, the setting process is carried out.

Fifth Embodiment

Figure 16:
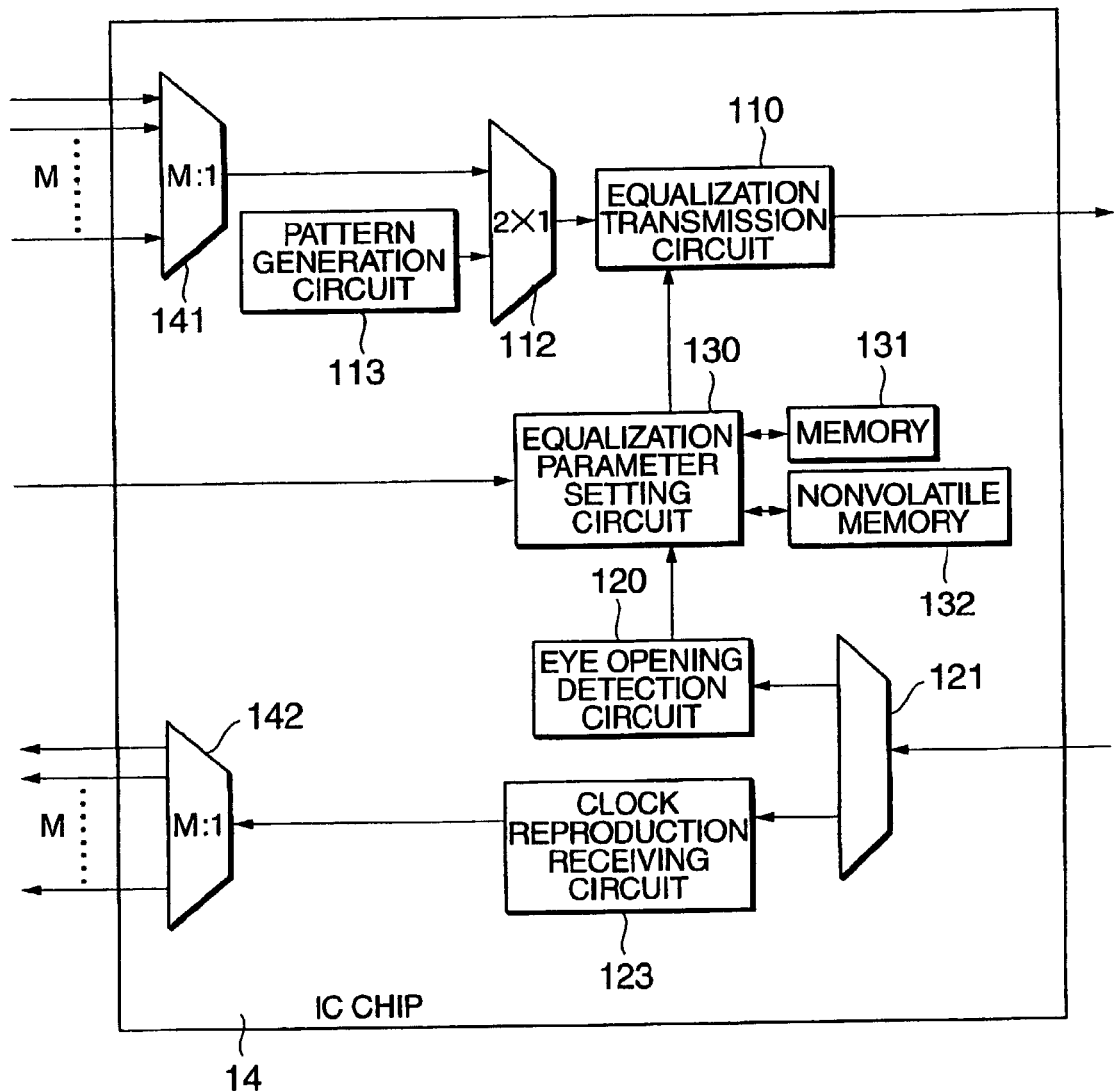
FIG. 16 is a diagram illustrating an embodiment of the present invention.

Referring to FIG. 16, description will be made of the constitution of a single IC chip 14 having the circuit configuration shown in FIG. 15 integrated thereon. The IC 14 time-multiplexes an M-channel low-speed parallel signal into a one-channel high-speed signal. Hence, it has an M:1 serializer 141 and an M:1 deserializer 142.

Sixth Embodiment

Figure 17:
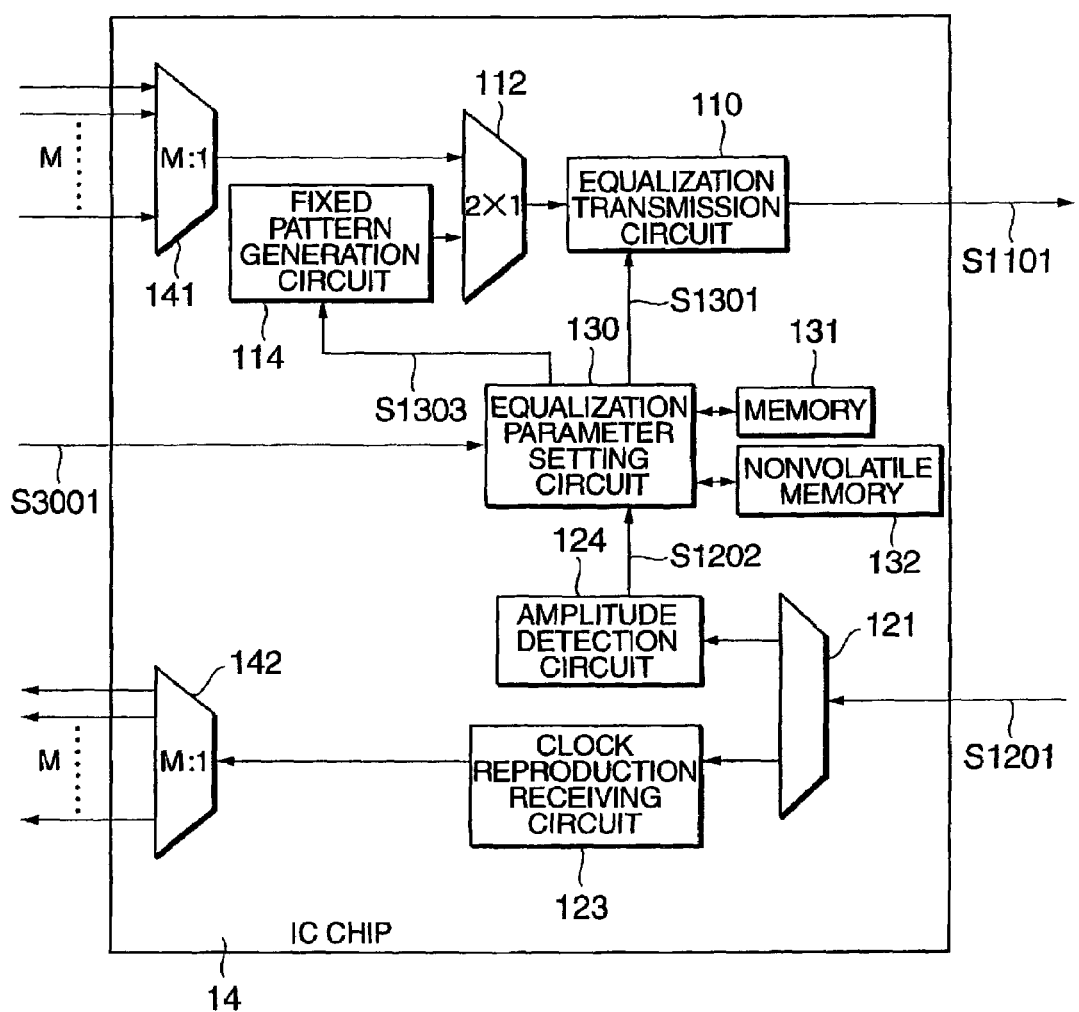
FIG. 17 is a diagram illustrating an embodiment of the present invention.

As shown in FIG. 17, it is possible to substitute the pattern generation circuit 113 which outputs a pseudorandom pattern and the eye opening ratio detection circuit 120 in the above-described circuit configuration with a fixed pattern generation circuit 114 which outputs two types of fixed patterns and an amplitude measuring circuit 124, respectively.

The present constitution serves as a substitute of the method of determining an eye opening ratio from a pseudo-random pattern.

The pattern generation circuit 114 generates two types of fixed patterns, i.e., a pattern A and a pattern B, based on a control signal S1303 from the equalization parameter setting circuit 130. The patterns A and B take regular rectangular wave shaped continuous patterns of different periods with a mark rate of 1/2. The pattern A is "010101 . . . " which corresponds to a maximum bit rate. The pattern B is a sufficiently long period pattern which is not subject to attenuation of high frequency components from the wirings on BWB and is lower than or equal to the same code continuous proof stress of an element associated with signal transmission.

Incidentally, the term "same code continuous proof stress," as used in this Application, is equivalent to the term, "maximum consecutive identical digits (CID) tolerance."

The circuit 124 for measuring the amplitude of a received waveform is satisfactorily constituted by a generally known envelope detection circuit involving rectification and a smoothing circuit.

The principle of the measurement is shown in FIG. 19. An optimum eye opening is obtained when the amplitude of a high frequency component of a received waveform, i.e., a short period pattern, is equivalent to the amplitude of a low frequency component of the waveform, i.e., a long period pattern.

From Va(0) and Vb(0) obtained by making a measurement twice by use of the short period pattern A and the long period pattern B, the rate of attenuation of the high frequency component can be determined as Va(0)Vb(0). That is, when the high frequency component of a transmitted waveform is emphasized to Va(0)Vb(0) times, an optimum eye opening can be obtained after transmission.

Figure 18:
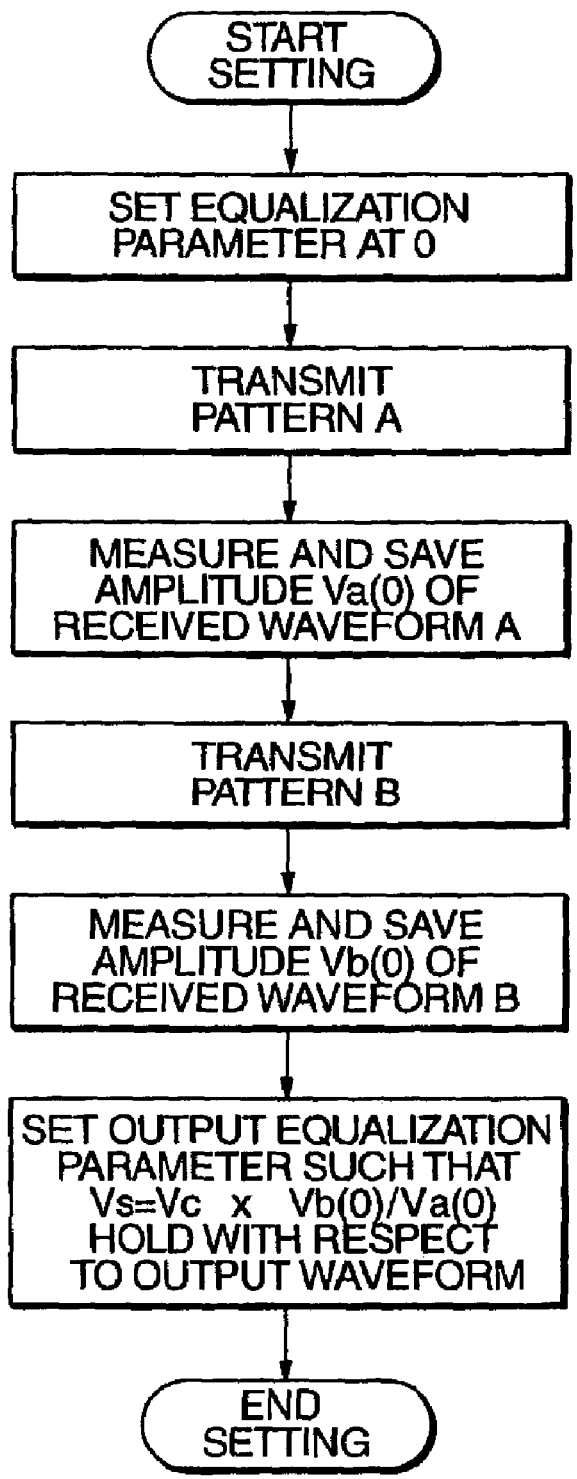
FIG. 18 is a flowchart of steps of setting an equalization parameter.

The procedural steps of the measurement is shown in FIG. 18. An equalization parameter is set at 0, and a pattern A is transmitted without transmission equalization. Then, the amplitude Va(0) of a received waveform is measured and stored in the memory 131. Then, a pattern B is transmitted with the same transmission setting, and the amplitude Vb(0) of a received waveform is measured and stored in the memory 131. From this result, by setting the equalization parameter such that the relationship between the Vs and Vc of transmitted waveforms becomes Vs=Vc×Vb(0)Va(0), setting of an optimum equalization parameter is completed.

By the measurement method of the present embodiment, time required to set the optimum equalization parameter can be shortened. For example, when the maximum value N of the equalization parameter is 256, a measurement must be repeated 256 times in the first embodiment. It took about 30 seconds when one measurement period T is 100 msec. In contrast, in the present embodiment, a measurement is repeated only twice, so that a significant time reduction of 200 msec can be achieved. This is sufficiently short time as compared with the initialization time of the whole device.

As described above, the present invention can automatically detect and set an optimum equalization parameter for each pattern wiring, thereby reducing man-hours which are required in the prior art and reducing time for adjustment. Therefore, unlike the prior art in which an equalization parameter is manually set for each PKG in view of the length of wiring on BWB, costs for producing a device can be reduced, and a reduction in the price of the device can be achieved.

While the present invention has thus far been disclosed in conjunction with several embodiments thereof, it will be readily possible for those skilled in the art to put the present invention into practice in various other manners.

What is claimed is:

1. An equalizer, comprising:
   a waveform detection circuit observing a first characteristic parameter of a first input signal;
   an equalization transmission circuit outputting an equalization transmission signal obtained by changing a second input signal based on a predetermined equalization parameter;
   an equalization parameter setting circuit setting the equalization parameter based on the first characteristic parameter;
   an initialization control circuit sweeping the equalization parameter within a predetermined range; and
   a memory storing a relationship between the swept equalization parameter and the equalization parameter, said relationship comprising a counter value at which an eye opening ratio of the first input signal reaches a maximum,
   wherein said waveform detection circuit detects a waveform of said first input signal; and
   a transmission line which supplies the first input signal and a transmission line to which the equalization transmission signal is output have mutually similar transmission properties.

2. A system, comprising:
   a first transmit-receive circuit,
   a second transmit-receive circuit, and
   a first transmission line and a second transmission line which connect the first and second transmit-receive circuits,
   wherein the first and second transmit-receive circuits include the equalizer of claim 1.

3. An equalization method, comprising the steps of:
   observing a first characteristic parameter of a first input signal,
   setting an equalization parameter based on the first characteristic parameter,
   changing a second input signal based on the equalization parameter, sweeping the equalization parameter within a predetermined range, and storing a relationship between the swept equalization parameter and the equalization parameter, said relationship comprising a counter value at which an eye opening ratio of the first input signal reaches a maximum, wherein the first and second input signals are input via transmission lines having mutually similar transmission properties.

4. The method according to claim 3, further comprising:

preemphasis, in which attenuation decreases if input frequency is greater than or equal to a predetermined cut-off frequency, is given to the second input signal in the changing step.

5. The method according to claim 4, wherein:

the equalization parameter comprises an equalization intensity corresponding to the cut-off frequency.

6. The method according to claim 4, wherein:

the equalization parameter comprises a rate of change in the attenuation.

7. The method according to claim 3, wherein:

the first input signal comprises a binary signal, and the first characteristic parameter comprises an opening ratio of an eye pattern.

8. The method according to claim 7, wherein the binary signal includes a pseudorandom pattern.

9. The method according to claim 7, wherein:

the binary signal includes a plurality of different fixed patterns.

10. The method according to claim 9, further comprising:

the equalization parameter setting step uses, as the opening ratio, the ratio of the amplitude of the binary signal to the amplitude of the plurality of different fixed patterns.

11. The method according to claim 8, wherein an optimum said opening ratio is obtained when an amplitude of a high frequency component of a received waveform is equivalent to an amplitude of a low frequency component of said received waveform.

12. An equalizer, comprising:

a waveform detection circuit for observing a first characteristic parameter of a first input signal, an equalization transmission circuit for outputting an equalization transmission signal obtained by changing a second input signal based on a predetermined equalization parameter, an equalization parameter setting circuit for setting the equalization parameter based on the first characteristic parameter, an initialization control circuit for sweeping the equalization parameter within a predetermined range, and a memory for storing a relationship between the swept equalization parameter and the equalization parameter, said relationship comprising a counter value at which an eye opening ratio of the first input signal reaches a maximum, wherein a transmission line which supplies the first input signal and a transmission line to which the equalization transmission signal is output have mutually similar transmission properties.

* * * * *